United States Patent [19]

Izbicki et al.

[11] Patent Number: 4,775,929
[45] Date of Patent: Oct. 4, 1988

[54] TIME PARTITIONED BUS ARRANGEMENT

[75] Inventors: Kenneth J. Izbicki, Hudson; William E. Woods, Natick; Richard A. Lemay, Carlisle; Steven A. Taque, Billerica, all of Mass.

[73] Assignee: Honeywell Bull Inc., Minneapolis, Minn.

[21] Appl. No.: 917,940

[22] Filed: Oct. 14, 1986

[51] Int. Cl.[4] .............................................. G06F 13/00
[52] U.S. Cl. .................................................... 364/200
[58] Field of Search ... 364/200 MS File, 900 MS File

[56] References Cited

U.S. PATENT DOCUMENTS

| 3,548,177 | 12/1970 | Hartlipp et al. | 364/900 |
|---|---|---|---|
| 4,070,702 | 1/1978 | Grants et al. | 364/900 |
| 4,245,307 | 1/1981 | Kapeghian et al. | 364/200 |
| 4,604,683 | 8/1986 | Russ et al. | 364/200 |

*Primary Examiner*—Gareth D. Shaw
*Assistant Examiner*—Debra A. Chun
*Attorney, Agent, or Firm*—George Grayson; John S. Solakian

[57] ABSTRACT

What is disclosed is a time partitioned bus arrangement for use in a computer system wherein different circuits therein are interconnected by a plurality of busses and operation is such that information to be processed can be read out of one circuit, processed in some manner in another circuit, and the processed information be stored in the same or another circuit all within one cycle of a system clock in the computer system, and without the need for bus control circuits and bus interfaces in the circuitry connected to the busses. Some of the circuits have their input/output connected to only a single one of the busses, while other circuits have their input connected to one bus and their output connected to a different bus, and yet other circuits have either their input or output connected to one of the busses and their other input/output connected to circuitry external to the bus arrangement. Some of the processor circuits have a control lead input that is energized by the clock signal output from the system clock so that they accept information from one bus to which their input is connected during a first polarity portion of a clock cycle and return either unprocessed or processed information to another bus during a second polarity portion of a clock cycle.

7 Claims, 2 Drawing Sheets

TIME PARTITIONED BUS ARRANGEMENT

FIELD OF THE INVENTION

This invention relates to bus arrangements used to transfer data and instructions between circuits in computers.

BACKGROUND OF THE INVENTION

In the prior art, busses are used extensively for transferring data and instructions between circuits in computers and between elements making up larger computer systems. These busses usually have a large number of leads, and data and instruction words made up of a fixed number of binary bits (typically eight, sixteen or thirty-two) are transferred, one word at a time, in parallel format over the busses between circuits.

Prior art busses usually have complex timing and control circuits to regulate use of the busses and to control transfer of data and information over the busses. While these complex prior art bus arrangements have been beneficial in some bus applications they have created problems in other applications. They have increased the complexity of many circuits in computers by requiring that they have bus interfaces so that they can operate on th bus, and have required bus controllers. This has raised circuit costs and has also increased the need for more complex software or firmware to control the bus controllers.

Thus, there is a need in the art in some bus applications for a bus arrangement that is simple, that doesn't require bus interfaces for circuits connected to such a bus arrangement, and that doesn't require a bus controller.

SUMMARY OF THE INVENTION

The above described need in the prior art for a simplified bus arrangement is satisfied by the present invention. This simplified bus arrangement is a time partitioned bus arrangement. There is no bus controller, and circuits connected to and operating together over the time partitioned bus arrangement have no bus interface circuits. Thus, bus operation is simplified, processing time is decreased, and costs are reduced.

Circuits connected to the novel time partitioned bus arrangement function together to respond to instructions and to process data during portions of each clock cycle of a system clock of the computer system. These clock portions are the positive half cycle and the negative half cycle of each clock pulse of the system clock. Some circuits are only activated in the time partitioned bus arrangement during the positive half cycle of the clock, while other circuits are only activated in the bus arrangement during the negative half cycle, and yet other circuits operate whenever there is an input to them. All these circuits are interconnected via a plurality of simple busses over which data and instruction words are passed in parallel. Data being processed may be output from a first circuit, routed via a first one of the busses to a second circuit which either routes the data to a second bus or performs some processing thereon and then outputs the processed data onto the second bus, and a third circuit is then used either to route the processed data back to the first bus or to process it further before placing it onto the first bus where it is returned to the first circuit or is routed to some other circuit. This is all done within one cycle of the system clock.

DESCRIPTION OF THE DRAWING

The operation of the invention will be better understood upon reading the following detailed description in conjunction with the drawing in which.

DETAILED DESCRIPTION

Figure 1:
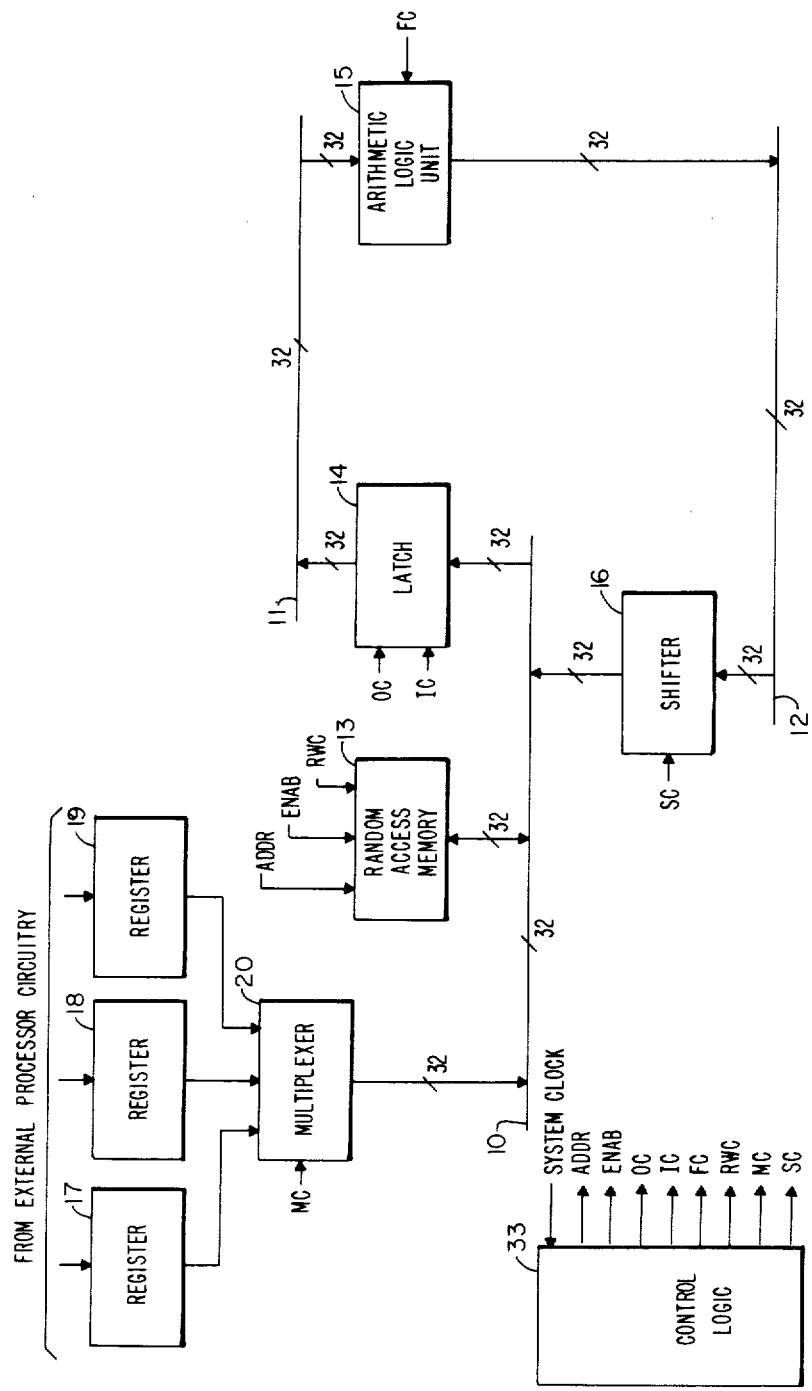
FIG. 1 is a block diagram of a portion of a computer system utilizing the novel time partitioned bus arrangement.

In FIG. 1 is seen a block diagram of one exemplary arrangement of the time partitioned bus arrangement. In the description immediately hereinafter references are made to FIG. 2 to better explain the time flow of actions in the circuits in FIG. 1. In the time partitioned bus arrangement disclosed herein there are three simple busses 10, 11 and 12, each having thirty-two parallel paths to handle thirty-two bit binary words. A number of circuits are connected to or between busses 10, 11 and 12. They are random access memory (RAM) 13, latch 14, arithmetic logic unit (ALU) 15, shifter 16, and multiplexer (MUX) 20. Multiplexer 20 is used to connect individual ones of registers 17, 18 and 19 to bus 10. These circuits are controlled in manner well known in the art by a control logic circuit 33.

RAM 13 has a number of addressable locations in which are stored addresses or data in a manner well known in the art. In an example explained further in this detailed description the source of information stored in RAM 13 is from external processor circuitry and is transferred to the RAM via registers 17, 18 and/or 19, multiplexer 20 and bus 10. RAM 13 has a single thirty-two lead input/output via which thirty-two bit data words are stored in or read out therefrom. The RAM has an addressing control input ADDR to indicate a location therein to be addressed, and also has a control lead ENAB that enables RAM 13 to be used. Furthermore, RAM 13 has a read/write control lead RWC which is used to indicate whether RAM 13 is to be written into or read from.

Latch 14 has a thirty-two bit input connected to bus 10 and a thirty-two bit output connected to bus 11. An input control lead IC controls opening the input of latch 14 to store information present on bus 10. There is also an output control lead OC which controls opening the output of latch 14 to place information stored therein onto bus 11. Latch 14 and its operation are well known in the art.

ALU 15 has a thirty-two bit input connected to bus 11 and a thirty-two bit output connected to bus 12. ALU 15 can perform a variety of functions on data input thereto as determined by control signals FC in a manner well known in the art.

Shifter 16 has a thirty-two bit input connected to bus 12 and a thirty-two bit output connected to bus 10. Shifter 16 is also well known in the art and can be used to perform functions such as transposing bits of binary words passing through the shifter. In the increment example described below shifter 16 acts under control of a signal on its control input SC from control logic circuit 3 to act as a buffer between busses 12 and 10 and passes input thereto directly through without changing them.

Thirty-two bit registers 17, 18 and 19 are well known in the art. They are individually connected to bus 10 via a multiplexer 20 which is under control of control logic circuit 33 via control lead MC to connect ones of the registers to bus 10.

Control logic circuit 33 controls the operations of the above identified circuits in a manner well known in the art but only its control of a few of the circuits is described in detail as are pertinent to understanding the operation of the present invention. This control is accomplished via control signals ADDR, ENAB, RWC, IC, OC, FC, MC and SC which go to the circuits having control leads of the same designation. The leads from control logic circuit 33 are not shown connected to the other circuits to avoid cluttering up the drawing.

Figure 2:
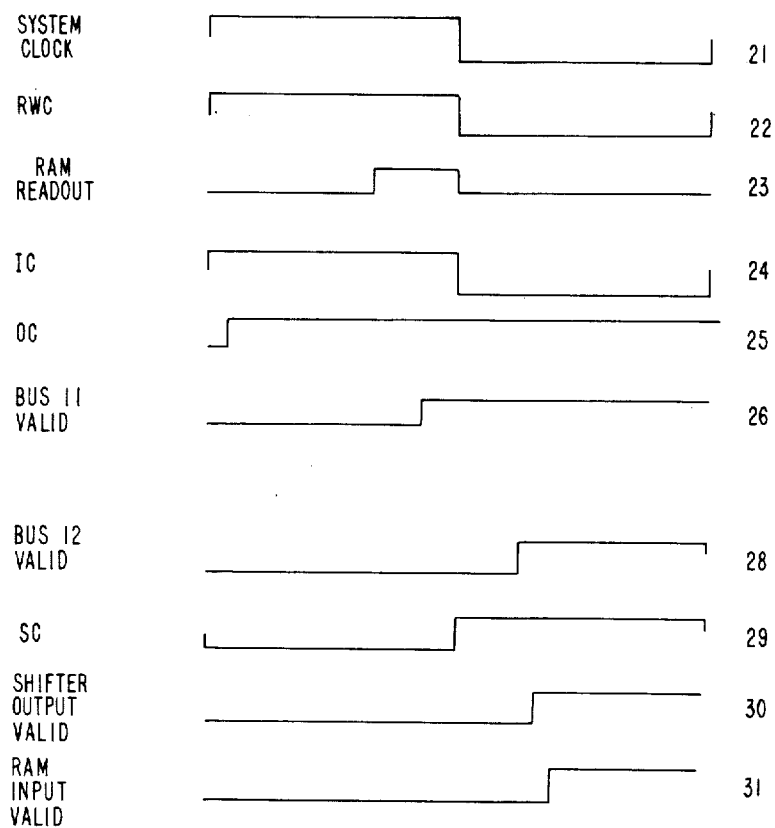
FIG. 2 is a timing chart showing the timing relationship between control signals and input and output signals in the circuits shown in FIG. 1.

Before describing the increment example using the time partitioned bus arrangement shown in FIG. 1, we turn briefly to FIG. 2 wherein is shown one cycle of system clock as signal 21. All computer systems have system clock used to generate timing signals that are used to control operations in the computer in a manner well known in the art. The waveform of one cycle of the system clock is clock signal 21. The time period of one cycle of the clock signal is all that it takes to perform a complete operation such as reading out the content of a location, incrementing it, and restoring it using the exemplary time partitioned bus arrangement described herein. While waveform 21 is shown to have equal duration positive and negative half cycles, they may be unequal to provide more or less time in one of the two portions of the cycle.

In the increment example of the operation of the novel time partitioned bus arrangement, binary numbers are stored in RAM 13. They are initially placed therein via registers 17, 18 and/or 19 which receive the numbers from external processor circuitry (not shown), multiplexer 20 and bus 10 as described further in this specification. One of the numbers is to be read out of a storage location in RAM 13, incremented, and stored back in the same storage location. This is a function that is often done by the processors of computer systems. To accomplish this incrementation, RAM 13 is enabled by control logic circuit 33 energizing its ENAB control input, the storage location of the desired number to be incremented is addressed via leads ADDR, and the RAM read/write control signal 22 shown in FIG. 2 is applied to the read-write control input RWC. Note that the RWC signal 22 applied to the read/write control input of RAM 13 is the system clock signal 21 shown in FIG. 2. In response to the positive portion of RWC signal 22 and the other RAM control signals described immediately above, RAM 13 has read out of it in parallel format a thirty-two bit number onto bus 10. This is represented as waveform 23 in FIG. 2.

The incrementation of the binary number read out of RAM 13 is to be accomplished by ALU 15 which has its input connected to bus 11, so latch 14 is used to transfer the number read out of RAM 13 from bus 10 to bus 11. Also, since RAM 13 has its output connected to bus 10 for the entire time of the positive half cycle of the RWC signal 22, the incremented number cannot be returned to the same input/output leads of RAM 13 until the negative half cycle of clock signal 21. Thus, latch 14 is primarily used to hold the unincremented number read out from RAM 13 during the negative half cycle of RWC signal 22. To accomplish holding the number to be incremented during the negative portion of RWC signal 22, a latch input control signal IC, which is waveform 24 shown in FIG. 2, is applied to input control lead IC of latch 14. Again, latch input control signal 24 is clock signal 21 as may be seen in FIG. 2. When the input control lead IC is high during the positive half cycle of control signal 24 the input of latch 14 is open and stores the number from RAM 13 present on bus 10. At the negative transition of the IC control signal on the latch input control lead of latch 14, the input of this latch is closed.

At essentially the same time, in response to the negative transition of signal 22 at its RWC control input, RAM 13 changes its operation from read to write so as to store whatever is on its input/output leads. During the entire cycle control logic 33 generates OC latch output signal 25 shown in Figure 2 and applied it to latch output control lead OC to thereby open the output of latch 14 to bus 11. In this manner the binary number stored in latch 14 is placed in bus 11 as soon as it arrives in the latch, as represented by waveform 26 in FIG. 2, and is thereby applied to the input of ALU 15.

The operation that arithmetic logic unit (ALU) 15 is to perform on the binary number present at its input is determined by control logic circuit 33 which applies control signals to the function control input FC causes ALU 15 to add one to the number present at its input and thereby increment it. The incremented number at the output of ALU 15 is represented as ALU output signal 28 in FIG. 2.

The incremented number output from ALU 15 is placed on thirty-two bit bus 12 where it is applied to the input of shifter 16. As mentioned previously in this specification shifter 16 may perform a variety of functions, but for this example all it does is buffer bus 12 from bus 10. Thus, the incremented number is passed directly through shifter 16 without being altered in any way and is placed on bus 10. The shifter output signal is represented as waveform 30 in FIG. 2.

Since at this time RAM 13 has its input/output in its input or write state due to the negative portion of the RWC signal present at its RWC control input, RAM 13 will store whatever is present on bus 10. The address present on address input ADDR has not changed. Thus, the incremented number on bus 10 is stored back in RAM 13 at the same memory location that the unincremented number was originally read out from at the beginning of the cycle of the system clock.

Thus, per the example just described, a binary number may be read out of memory, incremented and restored back in the memory within one cycle of the system clock, and without the need for complex control circuits for the busses or the circuits connected thereto. Such control circuits increase the cost and slow down the operation of the system.

Above in this specification it is mentioned that numbers stored in random access memory 13 may be input thereto via registers 17, 18 and/or 19 and bus 10. Numbers to be incremented are obtained from external processor circuitry (not shown) and are stored in registers 17, 18, and/or 19 in a manner well known in the art. They are then transferred one at a time via multiplexer 20 to bus 10 where they are present at the combined input and output of random access memory (RAM) 13. The operation of the control leads of RAM 13 are described in detail above in this specification so thier operation is not repeated here. It is sufficient to say that the control leads are used to enable RAM 13 to sequentially store the numbers present at its input/output from registers 17, 18 and/or 19. At a later time, after processing, modified values are stored in RAM 13 may be read out therefrom and be transferred via bus 10 to latch 14 and thence to ALU 15, the shifter 16 and/or external processor circuitry (not shown).

While what has been described herein is only one configuration of the preferred embodiment of the invention, it will be obvious to those skilled in the art that numerous changes may be made without departing from the spirit and scope of the invention. For example, in alternative embodiments of the invention not possible of all being shown in the drawing, many other configurations of circuits and busses may be assembled to utilize the novel time partitioned bus arrangement. To do this memory circuits such as random access memory 13 may have separate inputs and outputs and may be connected between two different busses, or have one input/output connected to one of busses 10, 11 or 12 and its other input/output connected to an external source of binary information (addresses or data). Further, latches such as latch 14 may also have a single combined input-output and be connected to a single bus and be used to buffer store binary information to be processed when the binary information source and processing circuit are connected to the same bus.

What is claimed is:

1. A bus arrangement for use in a processor system having system elements that perform functions such as storing, routing and processing information in the processor system, and having a system clock providing a clock signal having first and second portions, and wherein the information can be accessed, processed, and routed between a plurality of the system elements within said processor system within one cycle of said system clock, said bus arrangement comprising:
   a plurality of busses;
   a first plurality of circuits for processing said information, each of said first plurality of circuits having a first input and a first output both connected to an associated one of said plurality of busses, with said first input used to receive information present on the associated bus and said first output used to return information to the associated bus, each of said first plurality of circuits also having a first control input to which is applied a first control signal to enable it to receive information from its associated bus, perform its function, and return information to the associated bus;
   a second plurality of circuits, said second plurality of circuits each having an input and an output, each of said second plurality of circuits being connected to two different busses, with the input of each of said second plurality of circuits being connected to one bus, and the output of each of said second plurality of circuits being connected to another bus, each of said second plurality of circuits also having a second control input to which is applied a second control signal to enable it to receive information from its one bus, perform its function, and return information to the another bus; and
   a plurality of ones of said first and said second plurality of circuits having control signals applied to their control inputs to enable them to function and thereby route and process said information present at their input, said information being accessed, routed, and processed in said last mentioned ones of said first and said second plurality of circuits within one cycle of said system clock.

2. The invention in accordance with claim 1 further comprising:
   a third plurality of circuits connected to ones of said plurality of busses, each of said third plurality of circuits for storing both said information and said processed information, said information being read out of ones of said third plurality of circuits onto ones of said busses to be routed via ones of said second plurality of circuits and others of said plurality of busses to ones of said first plurality of circuits to be processed, and said processed information to be routed via ones of said second plurality of circuits and others of said plurality of busses to ones of said third plurality of circuits to be stored therein.

3. The invention in accordance with claim 2 wherein ones of said third plurality of circuits has a combined input and output connected to one of said busses and each of said ones of said third circuits has a control input to which an output from said system clock is applied, said control input being responsive to a first portion of cycles of said system clock to enable said ones of said third plurality of circuits to read out information stored therein onto the ones of said busses, and said control inputs being responsive to a second portion of said cycles of said system clock to enable said ones of said third circuits to store said information or said processed information present on the ones of said busses.

4. The bus arrangement in accordance with claim 1 further comprising:
   a control circuit providing said first control signals to said first plurality of circuits, and providing said second control signals to said second plurality of circuits.

5. The bus arrangement in accordnace with claim 4 wherein ones of said first plurality of circuits have a third control input to which is applied said clock signal, said ones of said first plurality of circuits being jointly responsive to said first portion of said clock signal and to said first control signal to enable their first input or first output, and are jointly responsive to said second portion of said clock signal and to said first control signal to enable the other of their first input or first output.

6. The bus arrangement in accordance with claim 5 wherein ones of said second plurality of circuits have a fourth control input to which is applied said clock signal, said ones of said second plurality of circuits being jointly responsive to said first portion of said clock signal and to said second control signal to enable their second portion of said clock signal and to said second control signal to enable the other of their second input or second output.

7. A bus arrangement for use in a processor system having a system clock comprising:
   a first bus,
   a first circuit having a combined input and output, said first circuit having a first control input to which an output from said system clock is applied, said first control input being responsive to a positive portion of a cycle of said system clock to enable said first circuit to place information from said first circuit onto said first bus via its combined input and output, and said first control input being repsonsive to a negative portion of said cycle of said system clock to enable said first circuit to receive information on said first bus via its combined input and output,
   a second bus,
   a third bus, a second circuit havig an input and an output, said second circuit input being connected to said first bus and said second circuit output being connected to said second bus, said second circuit having a second control input to which said output from said system clock is applied, said second control input being responsive to said positive portion of said cycle of said system clock to enable said second circuit to receive and temporarily store said information present on said first bus via its input, and to output said temporarily stored information it has received via first bus onto said second bus, a second circuit having an input and an output, said third circuit input being connected to said second bus and said third circuit output being connected to said third bus, said third circuit receiving said information placed on said second bus by said second circuit, processing same and placing the processed information onto said third bus via its output, and a fourth circuit having an input and an output, said fourth circuit input being connected to said third bus and said fourth circuit output being connected to said first bus, said fourth circuit transferring said processed information placed on said third bus by said third circuit onto said first bus, and said first circuit receiving via its combined input and output said processed information placed on said first bus by said fourth circuit during said negative portion of said system clock.

* * * * *